United States Patent
Lee et al.

(10) Patent No.: US 7,808,866 B2
(45) Date of Patent: Oct. 5, 2010

(54) APPARATUS AND METHOD FOR RECORDING/REPRODUCING DATA ON/FROM A RECORDING MEDIUM

(75) Inventors: Jeong Uk Lee, Seoul (KR); Jeong Kyo Seo, Anyang-si (KR); Yun Sup Shin, Seongnam-si (KR); Do Hyeon Son, Seoul (KR)

(73) Assignee: LG Electronics, Inc., Seoul (KR)

( * ) Notice: Subject to any disclaimer, the term of this patent is extended or adjusted under 35 U.S.C. 154(b) by 605 days.

(21) Appl. No.: 11/551,924

(22) Filed: Oct. 23, 2006

(65) Prior Publication Data

US 2007/0091743 A1    Apr. 26, 2007

(30) Foreign Application Priority Data

| Oct. 24, 2005 | (KR) | ................ | 10-2005-0100371 |
| Apr. 18, 2006 | (KR) | ................ | 10-2006-0034922 |
| Jun. 30, 2006 | (KR) | ................ | 10-2006-0060472 |
| Jul. 6, 2006 | (KR) | ................ | 10-2006-0063344 |

(51) Int. Cl.
    *G11B 7/00*    (2006.01)
(52) U.S. Cl. ................... 369/53.19; 369/44.32
(58) Field of Classification Search ............. 369/53.19, 369/44.32, 13.33, 112.23, 112.24, 44.37
    See application file for complete search history.

(56) References Cited

U.S. PATENT DOCUMENTS

| 6,442,110 | B1 | 8/2002 | Yamamoto et al. | |
| 7,304,920 | B2 * | 12/2007 | Arai et al. | 369/44.32 |
| 7,406,016 | B2 * | 7/2008 | Ishimoto | 369/53.28 |
| 7,420,897 | B2 * | 9/2008 | Yamasaki et al. | 369/44.32 |
| 7,457,217 | B2 * | 11/2008 | Stallinga et al. | 369/53.19 |
| 2003/0026173 | A1 * | 2/2003 | Verschuren | 369/13.06 |
| 2004/0100878 | A1 | 5/2004 | Chu et al. | |
| 2004/0264313 | A1 * | 12/2004 | Nagara et al. | 369/44.32 |
| 2005/0180283 | A1 * | 8/2005 | Ishimoto et al. | 369/53.19 |
| 2005/0259530 | A1 * | 11/2005 | Ishimoto et al. | 369/44.32 |
| 2006/0023577 | A1 | 2/2006 | Shinoda et al. | |
| 2006/0023582 | A1 * | 2/2006 | Maruyama | 369/44.37 |
| 2006/0092783 | A1 * | 5/2006 | Andersen et al. | 369/44.37 |

FOREIGN PATENT DOCUMENTS

| EP | 1052627 | 11/2000 |
| JP | 11-259872 | 9/1999 |
| JP | 2001-507495 T | 6/2001 |
| JP | 2004-118881 | 4/2004 |
| JP | 2004-220743 | 8/2004 |
| JP | 2005-259329 | 9/2005 |
| JP | 2005-332449 | 12/2005 |
| JP | 2006-120247 | 5/2006 |
| KR | 10-2002-0039506 A | 5/2002 |

* cited by examiner

*Primary Examiner*—Thang V Tran
(74) *Attorney, Agent, or Firm*—Lee, Hong, Degerman, Kang & Waimey

(57) ABSTRACT

There is provided an apparatus for recording/reproducing data on/from a recording medium including: a pickup unit including an objective lens and a solid immersion lens(SIL) to allow a light to be incident onto a recording medium; a photoelectric element for receiving the light reflected from the recording medium to output a controlling signal; and a controller to control the pickup unit using the controlling signal outputted from the photoelectric element, wherein the controlling signal includes a tilting error signal by skew of the recording medium.

21 Claims, 14 Drawing Sheets

FIG.1          Related Art
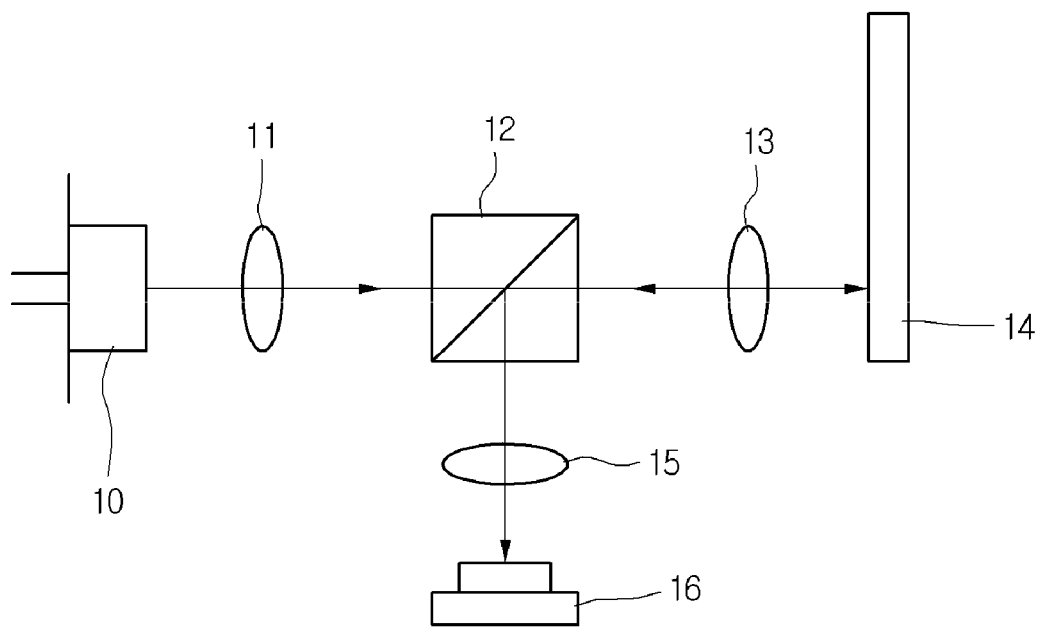
FIG.2          Related Art
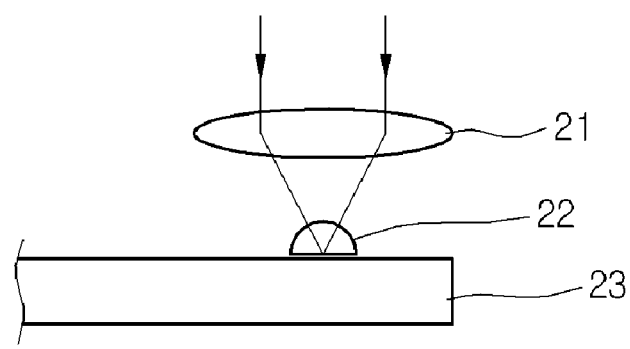

DATA RECORDING/REPRODUCING LAYER

APPARATUS AND METHOD FOR RECORDING/REPRODUCING DATA ON/FROM A RECORDING MEDIUM

CLAIM FOR PRIORITY

This application is based on and claims priority to Korean Patent Application Nos. 10-2005-0100371 filed on Oct. 24, 2005, 10-2006-0034922 file on Apr. 18, 2006, 10-2006-0060472 file on Jun. 30, 2006 and 10-2006-0063344 filed on Jul. 6, 2006 in the Korean Intellectual Property Office (KIPO), the entire contents of which are hereby incorporated by reference.

BACKGROUND OF THE INVENTION

1. Field of the Invention

The present invention relates to an apparatus and a method for recording or reproducing data using light.

2. Description of the Related Art

Recently, there emerges an optical recording medium that can rewrite data in high density, capable of recording and storing high quality video data and high quality audio data for a long time. For example, such medium includes a blue-ray disc.

As standardization for the blue-ray disc is under rapid process, related products are developed and brought to the market in preparation for commercialization. The blue-ray disc can store data of about 25 GB. When the blue-ray disc is manufactured in a dual layer, it can store high capacity data of about 50 GB.

Meanwhile, method of shortening a wavelength of a laser beam or increasing a numerical aperture (NA) of an objective lens have been used in order to increase a recording capacity of a recording medium.

FIG. 1 is a view of an optical system of an optical recording/reproducing apparatus according to a related art.

Referring to FIG. 1, a beam generated from a laser diode 10 is converted into a parallel beam by a collimator lens 11, passes through a beam splitter 12, and is condensed onto a recording medium 14 by an objective lens 13.

Also, a beam reflected by the recording medium 14 passes through the objective lens 13, and is reflected by the beam splitter 12, and then condensed by a lens 15 onto a light detector 16, so that the beam is detected as an electrical signal.

However, a method of shortening, at an optical system of FIG. 1, a wavelength of light in order to increase a recording capacity has reached almost limitation physically. Also, regarding a method of increasing an NA of an objective lens, it is difficult to make a great improvement using a related art far field recording method.

Accordingly, a near field recording method using a solid immersion lens is under active development, which is illustrated in FIG. 2.

Referring to FIG. 2, an SIL 22 is disposed below an objective lens 21 in the near field recording method. The SIL 22 is formed in a hemisphere shape made of a medium having a refractive index n greater than 1. The NA of the objective lens 21 is made to nxNA that is greater than 1 using the SIL 22, so that a recording capacity is increased even more.

Meanwhile, a gap between the SIL 22 and the recording medium 23 is tens of nano meters in the near field recording method. Therefore, in the case where skew or tilting is generated to the recording medium 23, the gap between the SIL 22 and the recording medium 23 cannot be maintained accurately, which may cause collision between the SIL 22 and the recording medium 23. An object of the present invention is to provide a recording/reproducing apparatus and a recording/reproducing method, capable of effectively obtaining a tilting error signal of a recording medium such that a gap between an SIL and the recording medium is maintained properly, and performing a servo operation allowing the gap between the SIL and the recording medium to be maintained properly using a tilting error signal.

SUMMARY OF THE INVENTION

There is provided an apparatus for recording/reproducing data on/from a recording medium including: a pickup unit including an objective lens and a solid immersion lens(SIL) to allow a light to be incident onto a recording medium; a photoelectric element for receiving the light reflected from the recording medium to output a controlling signal; and a controller to control the pickup unit using the controlling signal outputted from the photoelectric element, wherein the controlling signal includes a tilting error signal by skew of the recording medium.

In another aspect of the present invention, there is also provided an apparatus for recording/reproducing data on/from a recording medium including : a first optical system for detecting an electrical signal from a first light reflected by a recording medium using the first light; a second optical system for detecting a servo signal from a second light reflected by a solid immersion lens using the second light; and a pickup unit including an objective lens and the solid immersion lens to allow the first light to be incident onto the recording medium and which is driven in response to a controlling signal by a servo signal of the second light.

In further another aspect of the present invention, there is also provided a method for recording/reproducing data on/from a recording medium comprising: splitting a light, the light being incident onto the recording medium by a pickup unit, the pickup unit including an objective lens and a solid immersion lens; converting the splitted light to a control signal for controlling servo operation of the pickup unit; wherein the controlling signal includes a tilting error signal by skew of the recording medium.

BRIEF DESCRIPTION OF THE DRAWINGS

FIG. 1 is a view of an optical system of an optical recording/reproducing apparatus according to a related art;

FIG. 2 is a view explaining an optical system of a near field recording method;

DETAILED DESCRIPTION OF THE INVENTION

Reference will now be made in detail to the preferred embodiments of the present invention, examples of which are illustrated in the accompanying drawings.

A recording/reproducing apparatus according to an embodiment of the present invention includes an apparatus that can record/reproduce data to/from a recording medium, and also includes an apparatus that can perform record/reproduce operations of data.

It should be noted that terms of skew and tilting are used together in connection with tilting by skew generated at a recording medium.

Figure 3:
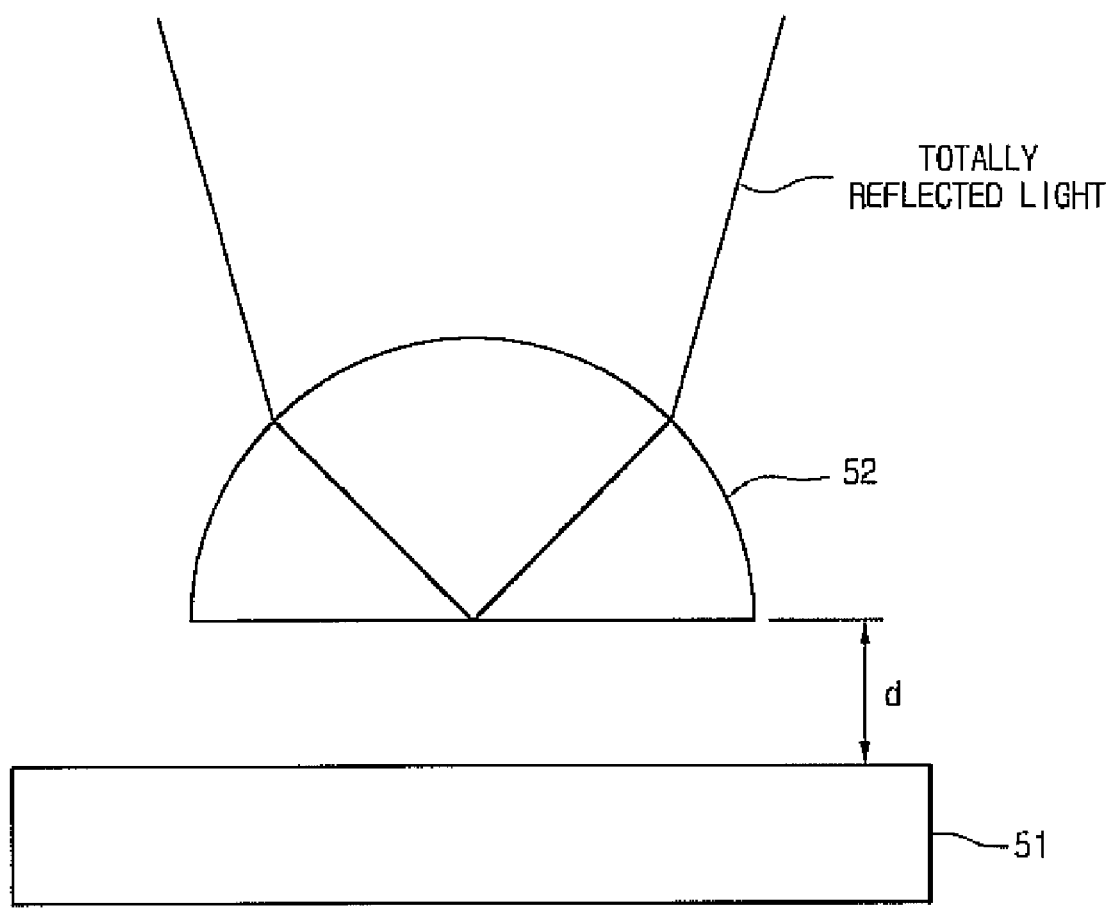
FIG. 3 is a side view of an SIL and a recording medium provided to a recording/reproducing apparatus using a near field.
Figure 4:
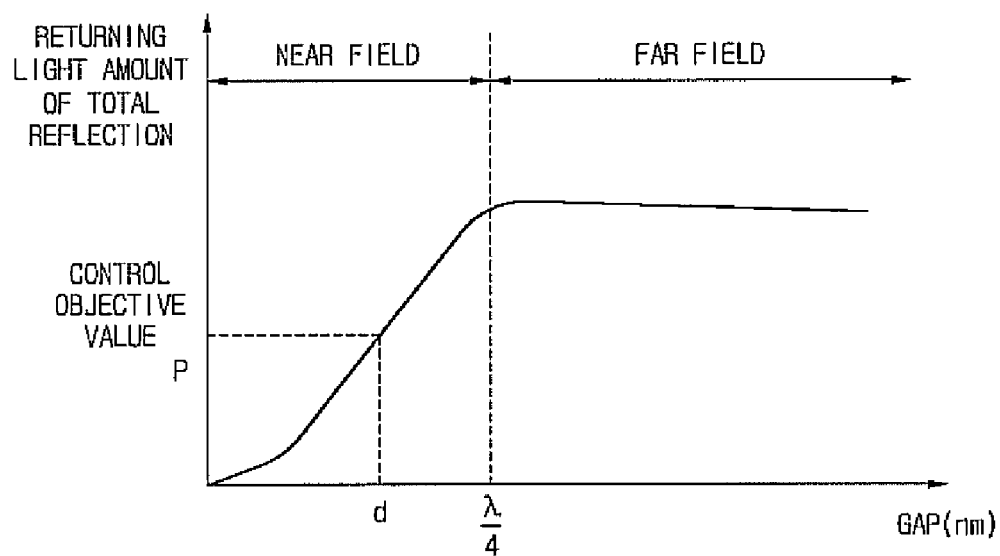
FIG. 4 is a view illustrating a relation between an amount of returning light and a gap.

FIG. 3 is a side view of an SIL and a recording medium provided to a recording/reproducing apparatus using a near field, and FIG. 4 is a view illustrating a relation between an amount of returning light and a gap.

A light that has passed through an objective lens is incident to an SIL 52 before the light is incident onto the recording medium 51. A portion of the light incident to the SIL 52 that is incident at a predetermined critical angle or more is totally reflected at a reflection surface of the SIL 52 and propagates to a photoelectric element (e.g., a photo detector) for observing the totally reflected light.

Also, in connection with a size of a light formed on the reflection surface of the SIL 52 and a gap d between the SIL 52 and the recording medium 51, a region defined as $\leq \lambda/2$ by a wavelength $\lambda$ of the light incident to the SIL 52 is a near field.

Also, a far field is defined as a state where the gap d satisfies $d \geq \lambda/2$ and a light does not extravasate to a data recoding layer.

However, in the case of a far field state, a light incident onto a cross-section of the SIL 52 at an angle of a critical angle or more is totally reflected and becomes returning light. Therefore, referring to FIG. 4, an amount of returning light of total reflection in the far field state is represented as a constant value.

On the other hand, in the case of a near field state, a portion of light incident onto a reflection surface of the SIL 52 at an angle of a critical angle or more extravasates to the data recording layer of the recording medium 51 at the reflection surface (i.e., a reflection boundary) of the SIL 52 as described above.

Therefore, referring to FIG. 4, it is revealed that an amount of returning light of total reflection exponentially reduces as it approaches the data recording/reproducing layer (exactly, a surface of the recording medium) of the recording medium 51.

Therefore, when a cross-section position of the SIL 52 is in a near field state, it is possible to control a gap between the cross-section of the SIL 52 and the data recording/reproducing layer of the recording medium 51 to be constant by performing a feedback servo operation on a linear portion that changes depending on a size of the gap d using a gap error signal.

A controller controls a pickup unit and a light power of a source, and the pickup unit includes a SIL and objective lens.

The controller controls the pickup unit by using a controlling signal, and the controlling signal includes a tilting error signal.

For example, referring to FIG. 4, when a control is performed so that an amount of returning light of total reflection becomes a control object value P, the gap d is maintained constant.

For an apparatus and a method for recording data or reproducing recorded data during a near field state, the present invention provides a more effective servo operation during recording or reproducing of data through a variety of embodiments.

Regarding a construction of an apparatus for recording/reproducing data to/from a recording medium, embodiments of the present invention include a case where one light source for creating a light and emitting the same is formed, and a case where two light sources are formed. These constructions should not be construed to limit the scope of the present invention, and a variety of embodiments can be proposed using these constructions.

Figure 5:
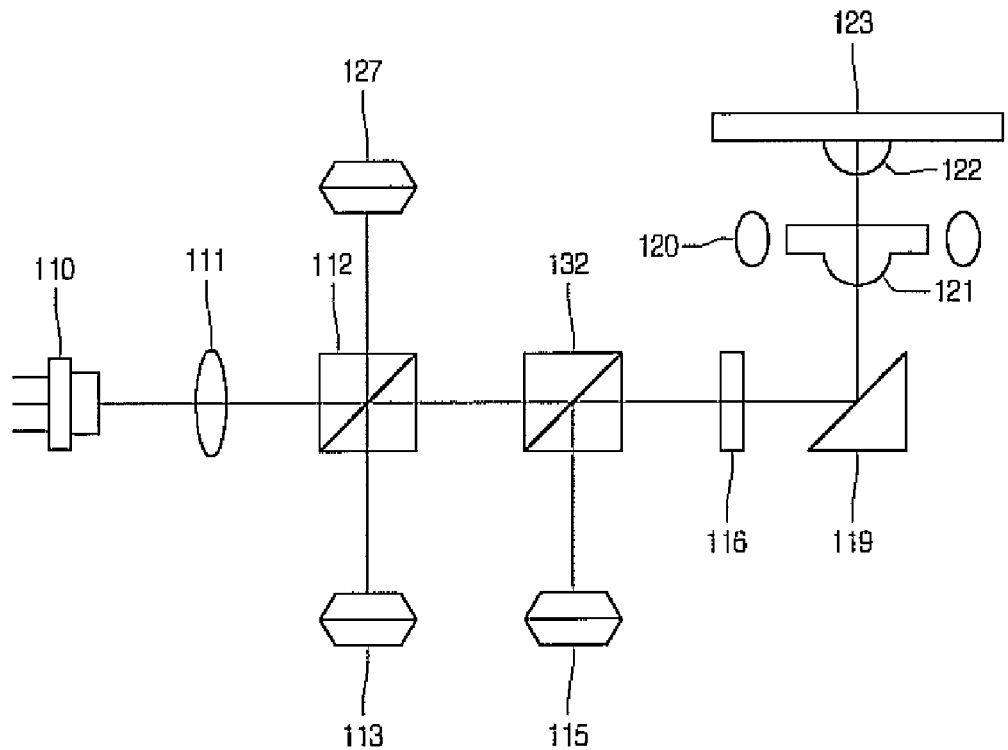
FIG. 5 is a view explaining a recording/reproducing apparatus according to an embodiment of the present invention.

FIG. 5 is a view explaining a recording/reproducing apparatus according to an embodiment of the present invention.

Referring to FIG. 5, the recording/reproducing apparatus includes a radio frequency (RF) optical block for recording/reproducing data to/from a recording medium 123, a servo optical block for controlling a gap between the recording medium 123 and an SIL 122, and a pickup unit 120 including the SIL 122 and an objective lens 121.

Each of the RF optical block and the servo optical block includes a polarization light splitter (PBS) for changing a path of a moving light, and a photoelectric element for converting an incident light into an electrical signal.

The recording/reproducing apparatus of FIG. 5 includes both an RF block and a servo optical block on a path of a moving bean emitted from a single light source 110.

In detail, the recording/reproducing apparatus includes a first light source 110 for emitting a light, a collimator lens 111 for changing the light emitted from the light source 110 into a parallel light, a first PBS 112 and a second PBS 132 for transmitting or reflecting an incident light depending on a polarization component of the incident light, a quarter wave plate (QWP) 116 for changing a wavelength of the incident light, and a reflection mirror 119 for guiding the light to a recording medium.

Also, the recording/reproducing apparatus further includes a first photoelectric element (e.g., a photodetector) 113 for converting a light reflected by the recording medium 123 and incident via the first PBS 112 into an electrical signal, and a second photoelectric element 115 for converting a light incident via the second PBS 132 into an electrical signal.

Here, the second PBS 132 and the second photoelectric element 115 constitute an RF optical block for obtaining an RF signal from a light reflected by the recording medium 123. It should be noted that an electrical signal obtained by the second photoelectric element 115 can be used for a purpose of obtaining a tilting error signal of the recording medium as well as detecting an RF signal.

Also, the first PBS 112 and the first photoelectric element 113 constitute a servo optical block for detecting a tilting error signal of the recording medium 123 having a difference in a moving path with respect to light incident from the second photoelectric element 115 of the light reflected by the recording medium 123.

The light source 110 may be a laser diode for emitting a laser having an excellent rectilinear characteristic. A light detector 127 for observing intensity of a light emitted from the light source 110 can be further provided. Intensity of a light emitted from the light source 110 can be maintained to constant intensity required for recording/reproducing operation by feeding back a signal from the light detector 127.

Also, the pickup unit 120 includes an SIL 122 and an objective lens 121 for condensing an incident light onto the recording medium 123.

In operation, a light emitted from the light source 110 is changed into a parallel light by the collimator lens 111, and incident onto the QWP 116 via the first and second PBSs 112 and 132.

Also, the light is converted from a linear polarized light to a circular polarized light at the QWP 116 and incident onto the reflection mirror 119.

A light reflected by the reflection mirror 119 passes through the objective lens 121 and the SIL 122 and is incident onto the recording medium 123. At this point, the pickup unit 120 includes a coil and a magnetic circuit to perform a servo operation for a gap error and a tilting error.

Here, a speed of a light incident to the SIL 122 is slowed down by a refractive index n of the SIL 122, and a wavelength of the light is shortened by 1/n. Therefore, a diffraction limit inside the SIL 122 is reduced to less than a general value of 1/n, and an effect that a numerical aperture (NA) of the objective lens 121 is increased by n times is achieved.

Meanwhile, a polarized component of a light reflected by the recording medium 123 is changed by 180° and converted into a linear polarized light at the QWP 116. Here, a polarization direction is changed into a polarization direction perpendicular to an original polarization direction.

Also, a reflected light whose polarization direction has changed cannot pass through the second PBS 132 and is reflected to be incident to the second photoelectric element 115.

At this point, a portion of the reflected light has a distorted polarization and passes through the second PBS 132 and is reflected by the first PBS 112 to be incident to the first photoelectric element 113.

The first and second photoelectric elements 113 and 115 convert an incident light into an electrical signal, and can detect a tiling error signal regarding tilting of the recording medium 123 using the created electrical signal.

Here, the second photoelectric element 115 receives an RF signal containing data recorded on the recording medium 123 and converts the RF signal into an electrical signal, thereby performing a reproducing operation of data.

Also, a signal converted into an electrical signal by the first photoelectric element 113 is used for the purpose of measuring skew of the recording medium 123. Particularly, an electrical signal converted by the second photoelectric element 115 is also used for detecting a tilting error signal of the recording medium.

Next, a method for detecting skew or a tilting error signal of the recording medium 123 will be described below.

Figure 6:
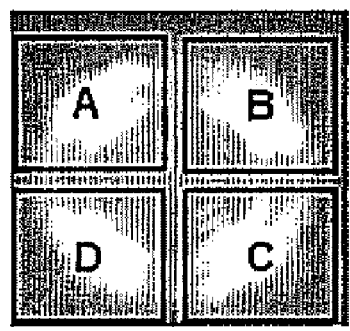
FIG. 6 is a view illustrating a beam spot observed by a photoelectric element in the case where skew is not generated to a recording medium.
Figure 7:
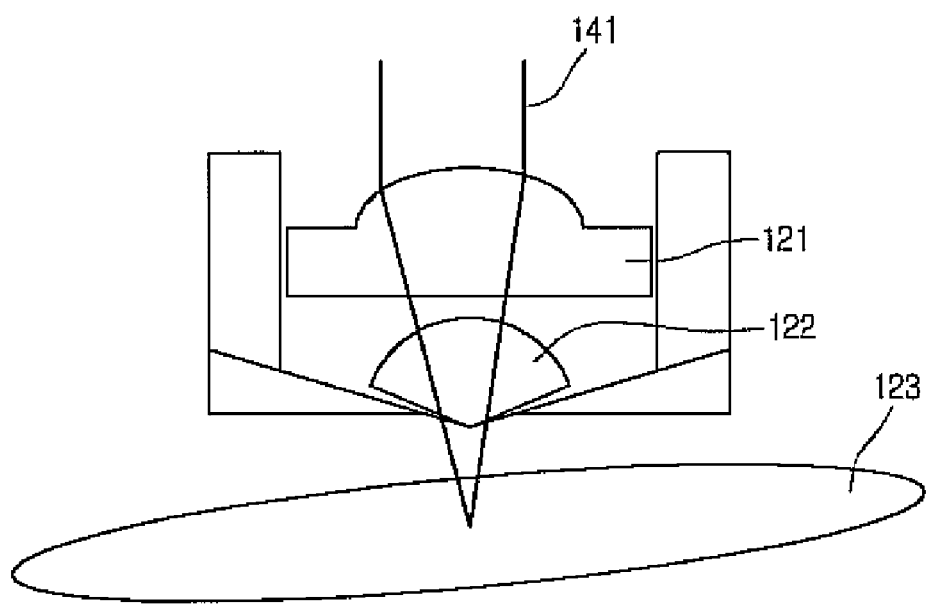
FIG. 7 is a view explaining the case where skew is generated to a recording medium.
Figure 8:
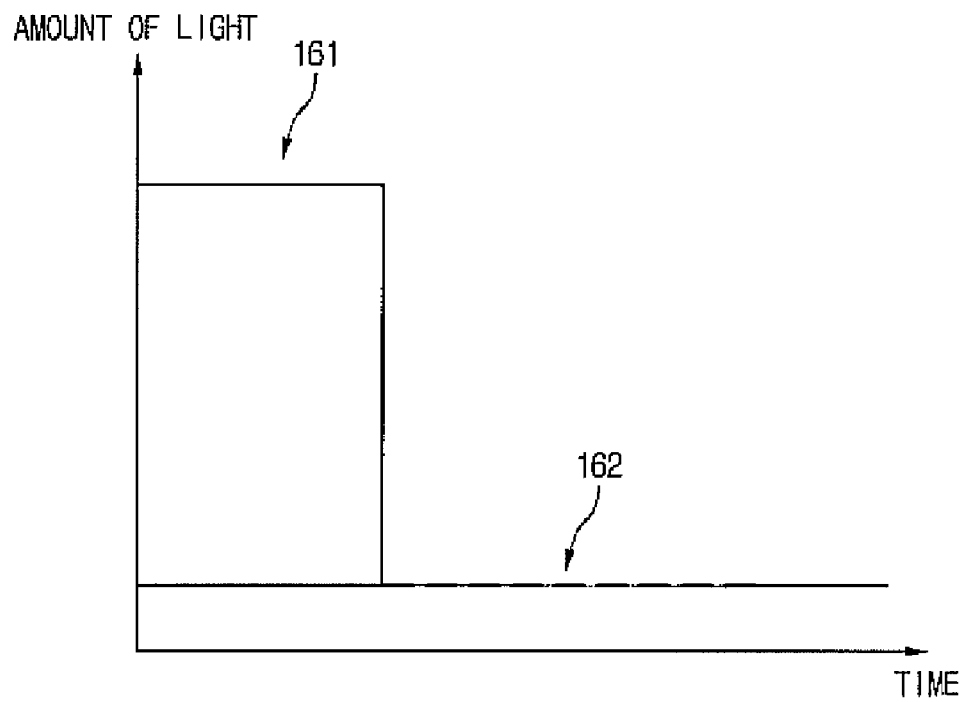
FIG. 8 is a view illustrating a beam spot observed by a photoelectric element in the case where skew is generated to a recording medium.

FIG. 6 is a view illustrating a light spot observed by a photoelectric element in the case where skew is not generated to a recording medium, FIG. 7 is a view explaining the case where skew is generated to a recording medium, and FIG. 8 is a view illustrating a light spot observed by a photoelectric element in the case where skew is generated to a recording medium.

In the case where tilting is not generated to the recording medium 123 while a predetermined gap is maintained between the SIL 122 and the recording medium 123, a light spot having four portions of somewhat darkness and constant brightness is observed (FIG. 6).

Meanwhile, referring to FIG. 7, when tilting (or skew) is generated to the recording medium 123 while a light 141 is incident onto the recording medium 123, a tilting amount of the recording medium 123 can be detected using an electrical signal of a light spot observed by the first and second photoelectric elements 113 and 115. Accordingly, a gap servo operation that can prevent damage of the SIL 122 caused by collision between the SIL 122 and the recording medium 123 can be performed.

In the case where skew is generated to the recording medium 123 as illustrated in FIG. 7, a light spot observed by the photoelectric element has dark portions and bright portions irregularly formed as illustrated in FIG. 8. According to the present invention, a tilting error signal of the recording medium can be detected using a light spot observed by the photoelectric element, Also, a difference in a light amount observed by the photoelectric element for converting a light reflected by the recording medium into an electrical signal when skew is generated to the recording medium, will be described below.

Figure 9:
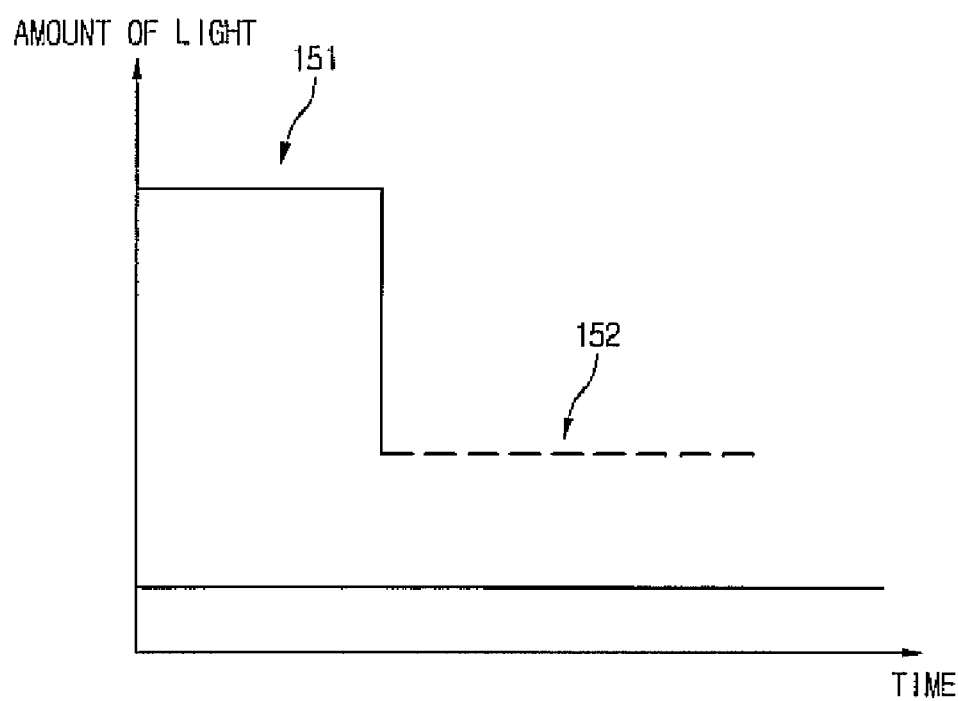
FIG. 9 is a graph illustrating an amount of light incident to a photoelectric element in the case where skew is generated to a recording medium.
Figure 10:
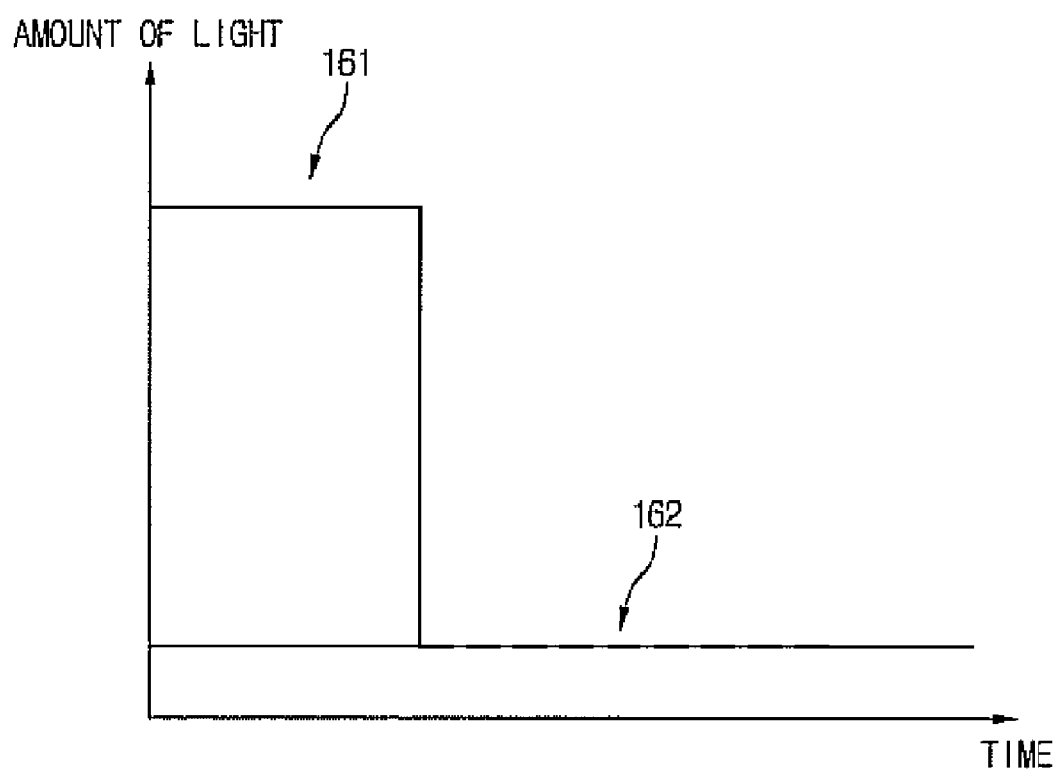
FIG. 10 is a graph illustrating an amount of light incident to a photoelectric element in the case where skew is not generated to a recording medium.

FIG. 9 is a graph illustrating an amount of light incident to a photoelectric element in the case where skew is generated to a recording medium, and FIG. 10 is a graph illustrating an amount of light incident to a photoelectric element in the case where skew is not generated to a recording medium.

In the graphs illustrated in FIGS. 9 and 10, an X-axis represents time as a variable. FIGS. 9 and 10 mean a gap between the SIL and the recording medium gradually decreases as a time elapses.

Referring to FIG. 9, a maximum amount of light 151 is incident to the photoelectric element at first. As the SIL gradually approaches closely to the recording medium, an amount of light incident to the photoelectric element gradually decreases. Also, even when the SIL contacts the recording medium, a predetermined amount of light is detected.

In this case, skew is generated to the recording medium, and a gap servo operation for correcting tilting of the recording medium can be performed.

On the other hand, referring to FIG. 10, when skew is not generated to the recording medium, a maximum amount of light 161 is incident to the photoelectric element, but when a gap between the SIL and the recording medium gradually narrows, a light that can detect a skew amount (or tilting amount) of the recording medium from a light reflected by the recording medium is not received (162).

That is, when skew or tilting is generated to the recording medium, it is possible to detect an RF signal using a light reflected from a data recording layer of the recording medium, and simultaneously, to detect a tilting amount of the recording medium using a light reflected from a total reflection surface of the SIL.

However, in the case where skew is not generated to the recording medium, only a light reflected by the data recording layer of the recording medium is detected, and a light reflected from the total reflection surface of the SIL does not appear. In this case, a difference in a light amount of a light spot detected by the first photoelectric element 113 illustrated in FIG. 5 does not exist.

Hereinafter, a method for more accurately measuring skew generated to a recording medium using a light spot observed by the photoelectric element will be described.

Figure 11:
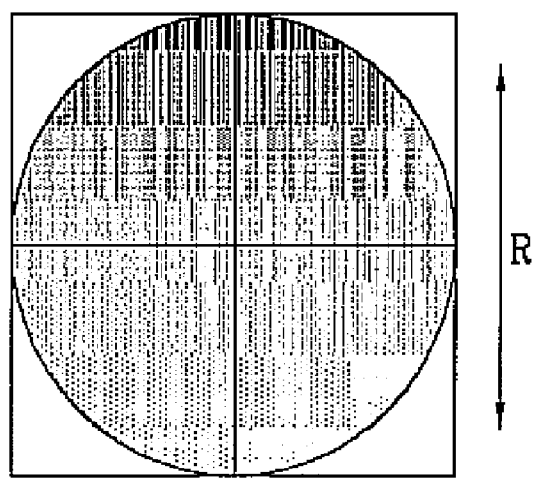
FIGS. 11 and 12 are views illustrating a beam spot detected by a photoelectric element in the case where skew is generated at a recording medium.
Figure 12:
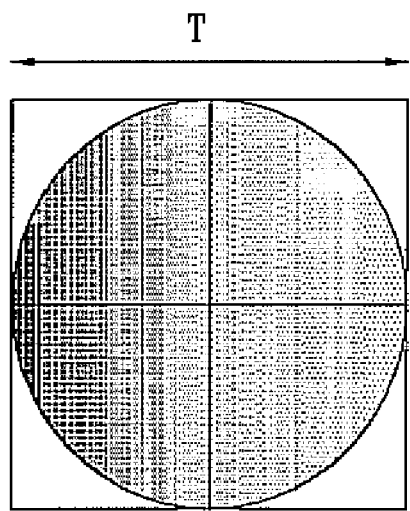

FIGS. 11 and 12 are views illustrating a light spot detected by a photoelectric element in the case where skew is generated at a recording medium.

First, since skew is not generated to the recording medium 123 in only a predetermined direction, skew generated to the recording medium can be quantified in two cases as illustrated in FIGS. 11 and 12.

Each of the photoelectric elements according to an embodiment of the present invention, i.e., the first and second photoelectric elements 113 and 115 can include a photodetector divided into four parts, but is not limited thereto. Embodiments of the present invention can be applied to any photodetector allowing a difference in a light amount caused by skew of a recording medium.

Skew generated to the recording medium can be divided into a radial direction R and a tangential direction T of the recording medium. At this point, the radial direction R and the tangential direction T are defined using a line connecting a center of the recording medium with a position onto which a light is illuminated for a reference.

That is, a direction of a line extending from a virtual reference line connecting the center of the recording medium with the position onto which the light is illuminated is defined as the radial direction R of the recording medium. A direction perpendicular to the virtual reference line is defined as the tangential direction T. At this point, a light amount detected by each of the photoelectric elements 113 and 115 has a difference depending on skew of the recording medium.

FIG. 11 illustrates the case where skew is generated in the radial direction R of the recording medium, and FIG. 12 illustrates the case where skew is generated in the tangential direction T of the recording medium.

As described above, since intensity of reflected light shows difference depending on a gap between the SIL and the recording medium, a difference in a light amount received to the photoelectric element is substantially generated when skew is generated to the recording medium.

Referring to FIGS. 11 and 12, a bright portion of a light signal represents a gap between the SIL and the recording medium is relatively large, and a dark portion represents a gap between the SIL and the recording medium is relatively small.

Therefore, a skew direction generated to the recording medium can be known using a light spot observed by the photoelectric element, and a method for detecting an error signal regarding generated skew will be described below.

Figure 13:
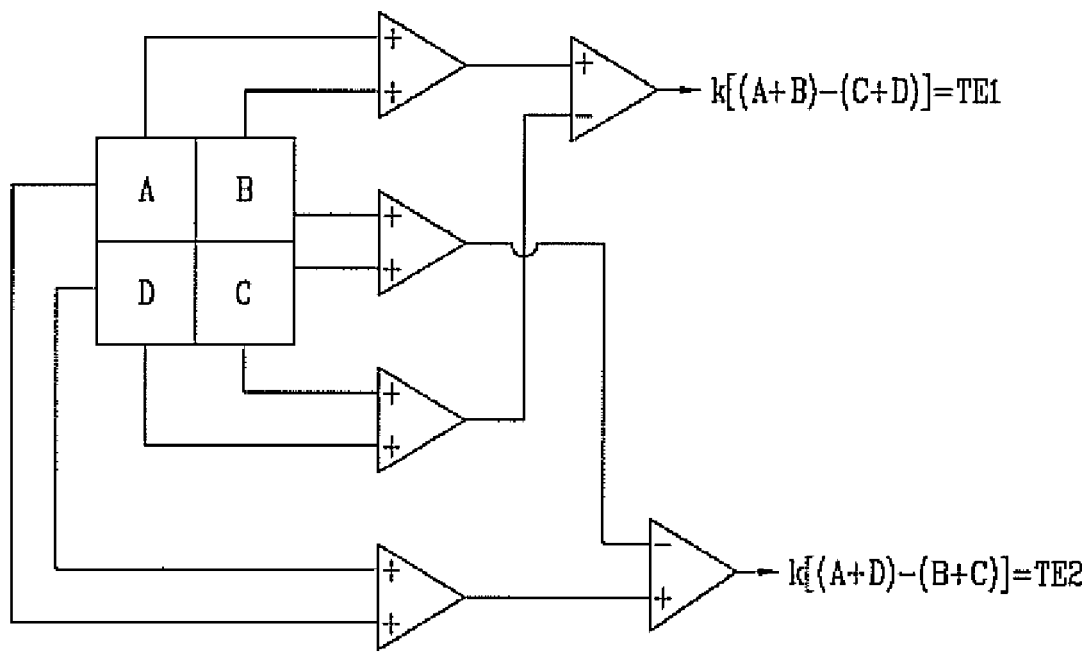
FIG. 13 is a view explaining a method for detecting an electrical signal from a photoelectric element.
Figure 14:
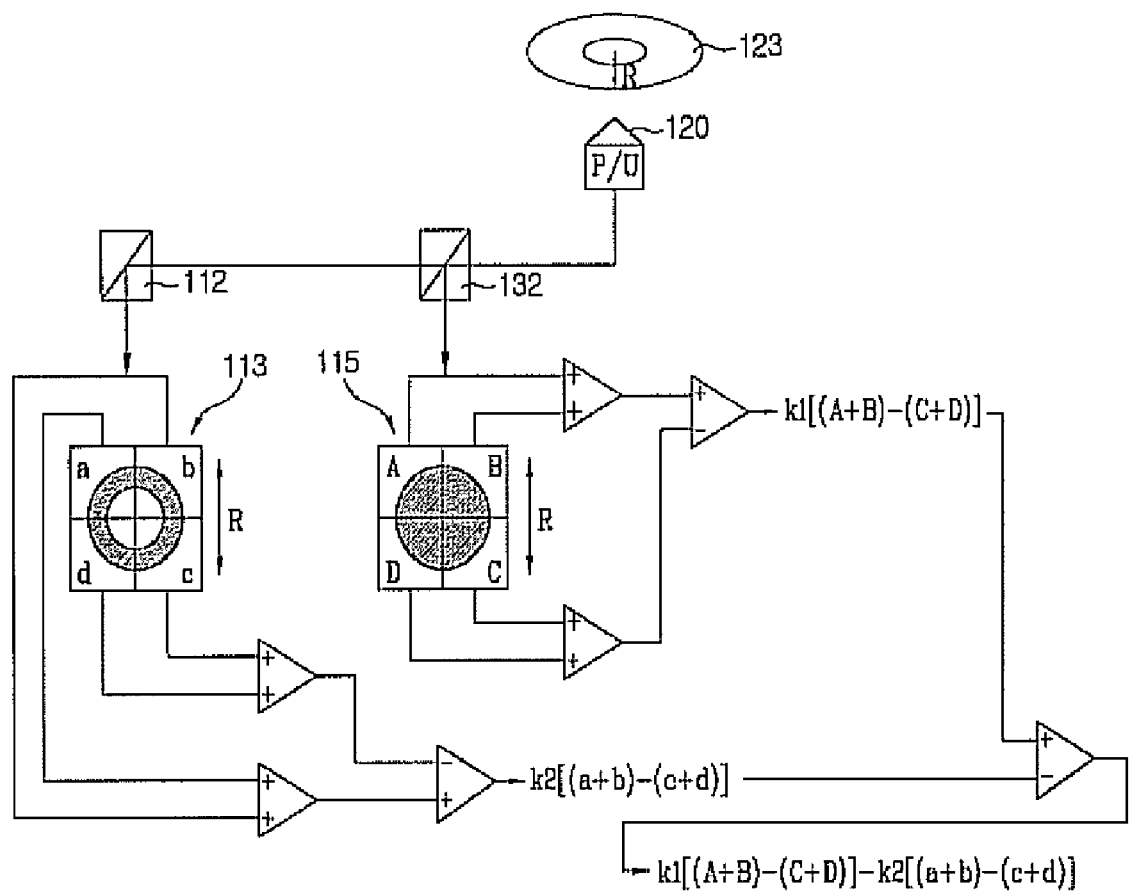
FIG. 14 is a view explaining a method for detecting an electrical signal from a first photoelectric element and a second photoelectric element.

FIG. 13 is a view explaining a method for detecting an electrical signal from a photoelectric element, and FIG. 14 is a view explaining a method for detecting an electrical signal from a first photoelectric element and a second photoelectric element.

First, referring to FIG. 13, the photoelectric element can include photodetector divided into four parts. Here, the photoelectric element can be the first photoelectric element illustrated in FIG. 5.

Also, each of detecting devices A, B, C, and D outputs a signal corresponding to light amounts received thereto. At this point, the output signal is shown as each of A, B, C, and D for easy understanding.

At this point, it is possible to create tilting error signals in the radial direction R and the tangential direction T using A, B, C, and D output from the respective detecting devices. The tilting error signal TE1 in the radial direction R can be created as a difference signal of a signal (A+B/C+D) detected by the detecting devices divided in the radial direction R.

Also, a tilting error signal TE2 in the tangential direction T can be created as a difference signal of a signal (A+D/B+C) detected by the detecting devices divided in the tangential direction R.

Here, $TE1=k1[(A+B)-(C+D)]$, and $TE2=k2[(A+D)-(B+C)]$.

That is, since the difference signal represents a difference in a light amount depending on a direction of skew generated to the recording medium, it is used as a tilting error signal. At this point, a signal formed by a reflection light can be divided in the tangential direction and the radial direction of the recording medium to control tilting. Through this process, a servo operation of controlling the SIL can be performed to cancel skew generated to the recording medium.

Besides this method, a method for more accurately detecting a tiling error signal is shown in FIG. 14. A light passing through the SIL cannot be accurately illuminated onto the recording medium by not only skew generated to the recording medium, eccentricity of the recording medium, or other reasons.

That is, there is a track error which can be generated when a center of the recording medium itself is formed to have eccentricity when a light moves during rotation of the recording medium. In this case, a difference signal detected by the method with reference to FIG. 13 can contain the track error signal therein.

Therefore, an error needs to be compensated for by removing an influence caused by the track error from a difference signal detected in FIG. 13.

For this purpose, it is necessary to judge whether a track error by a movement of a track exists and to create a tilting error signal capable of compensating for a track error signal. That is, since a tilting signal operation equation for the radial direction operated at each of the photoelectric elements 113 and 115 is the same as an operation equation for detecting a track error signal, a difference of a signal detected by the two photoelectric elements 113 and 115 is obtained using a method for canceling a track error component to remove an influence of a track error.

At this point, an error of a tilting error signal by a track error can be compensated for tilting error signals of the radial direction and the tangential direction. Since an operation can be performed using the same method, the present invention will be described in detail with reference to FIG. 14 using an embodiment as a tilting error signal of the radial direction.

A light illuminated onto the recording medium 123 via the SIL formed on the pickup unit 120 is reflected by the recording medium 123 and reflected by the second and first PBSs 132 and 112, and received by the second photoelectric element 115 and the first photoelectric element 113.

A light received by the second photoelectric element 113 creates a tilting error signal using signals A, B, C, and D output from respective detecting devices constituting the second photoelectric element. That is, as described above, a tilting error signal is a difference of signals that are separated in the radial direction and summed (i.e., [(A+B)−(C+D)]) when a radial direction of the recording medium is used for a reference.

Also, a portion of the light reflected by the recording medium 123 is received by the first photoelectric element 113 with a predetermined path difference with respect to a light incident to the second photoelectric element 115.

The light received by the first photoelectric element 113 creates a tilting error signal using signals a, b, c, and d output from respective detecting devices constituting the first photoelectric element.

That is, as described above, a tilting error signal is a difference of signals that are separated in the radial direction and summed (i.e., [(a+b)−(c+d)]) when a radial direction of the recording medium is used for a reference.

Referring to FIG. 14, a difference in a value obtained by multiplying a tilting error signal by a proportional constant is obtained to form an error-compensated tilting error signal in order to remove an influence caused by a movement of the track movement from the tilting error signal.

That is, a tilting error in the radial direction of the recording medium and a tilting error in the tangential direction can be calculated using the following equations.

$$k3[(A+B)-(C+D)]-k4[(a+b)-(c+d)] \quad \text{Equation 1}$$

$$k5[(A+D)-(B+C)]-k6[(a+d)-(b+c)] \quad \text{Equation 2}$$

Equation 1 is a tilting error signal in the radial direction, and Equation 2 is a tilting error signal in the tangential direction.

Also, tilting error signals detected by the first and second photoelectric elements 113 and 115 include both error data regarding tilting and error data regarding track movement.

The first and second photoelectric elements 113 and 115 receive the same light reflected by the recording medium 123 but the received lights have path differences, respectively. Therefore, a change in the light caused by skew of the recording medium 123 is the same, but a movement path difference of the light or a light amount differs, so that a degree of a change can has a difference.

In this case, an error by a track movement can be removed and an error-compensated tilting error signal can be created by multiplying predetermined proportional constants k3, k4, k5, and k6.

As described above, the light reflected by the recording medium 123 are received by the two photoelectric elements 113 and 115, which can create tilting error signals of the radial direction R and the tangential direction T. At this point, the tilting error signal uses a characteristic that the light linearly changes depending on a change in a gap between the SIL and the recording medium 123, which has been described in detail in the above.

Also, tilting error signals described in Equations 1 and 2 create error-compensated tilting error signals by calculating a difference in a value obtained by multiplying a proportional constant to cancel an error caused by a track movement in order to remove an error caused by the track movement.

That is, Equations 1 and 2 become tilting error signals of the recording medium in which an error caused by the track movement has been canceled with respect to the radial direction and the tangential direction of the recording medium.

A slop of the SIL by the pickup unit 120 is controlled during recording or reproduction operation of data using the above-created error-compensated tilting error signal, and horizontality is maintained within a limit range, so that stable data processing can be performed.

Here, the second photoelectric element 115 creates a recording/reproducing signal (RF signal) or a track error signal, and the first photoelectric element 113 creates a gap error signal.

The above embodiment of the present invention has described a servo operation for the case where one light source for emitting a light is provided. Hereinafter, a servo operation for the case where two light sources for emitting lights having different wavelengths, respectively, are provided as another embodiment of the present invention.

Figure 15:
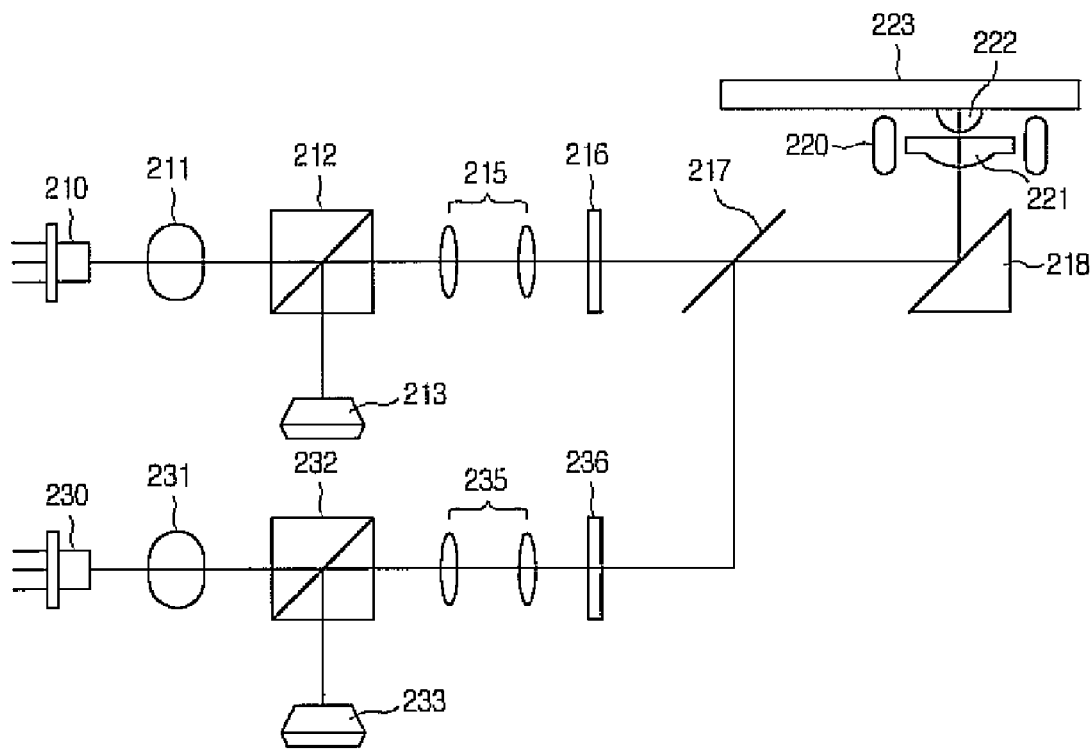
FIG. 15 is a view explaining a recording/reproducing apparatus according to another embodiment of the present invention.

FIG. 15 is a view explaining a recording/reproducing apparatus according to another embodiment of the present invention.

Referring to FIG. 15, a recording/reproducing apparatus includes an RF optical block for recording/reproducing data to/from a recording medium 223, a gap servo optical block for controlling a gap between the recording medium 223 and an SIL 222 and a pickup unit 220 having an objective lens 221 and the SIL 222 for allowing light to be incident onto the recording medium 223 and onto which light reflected by the recording medium 223 is incident.

A servo signal used hereinafter includes a tilting amount of the recording medium 223(323) and a movement amount of the objective lens 221(321) or the pickup unit 220. The servo signal corresponding to the tilting amount of the recording medium 223(323) is a first servo signal, and the servo signal corresponding to the movement amount of the objective lens 221(321) or the pickup unit 220 is a second servo signal.

The RF optical block includes a first light source 210 for emitting a blue light in a wavelength band of 405 nm, a first collimator lens 211 for changing the light emitted from the first light source 210 into parallel light, a first PBS 212 for transmitting or reflecting an incident light depending on a polarization component of the incident light, a first light expander 215 for controlling a diverging angle or a converging angle of the light, a first QWP 216 for changing a wavelength of the incident light, and a light splitter 217.

Also, the RF optical block also includes a first photoelectric element (e.g., a photodetector 113) for detecting an RF signal reflected by the recording medium 223 and incident via the first PBS 212.

Also, the gap servo optical block includes a second light source 230 for emitting a red light in a wavelength band of 650 nm, a second collimator lens 231 for changing the light emitted from the second light source 230 into parallel light, a second PBS 232 for transmitting or reflecting an incident light depending on a polarization component of the incident light, a second light expander 235 for controlling a diverging angle or a converging angle of the light, and a second QWP 236 for changing a wavelength of the incident light.

Also, the gap servo optical block also includes a first photoelectric element for detecting a gap error signal totally reflected by the SIL 222 and incident via the second PBS 232.

Also, the pickup unit 220 includes the SIL 222 and the objective lens 221 for condensing the incident light onto the recording medium 223.

In operation, a first light emitted from the first light source 210 is changed into parallel light at the first collimator lens 211, and passes through the first PBS 212. A diverging angle or a converging angle of the first light is controlled by the first light expander 215.

Also, the first light is converted from a linear polarized light to a circular polarized light at the first QWP 216, and is incident to the reflection mirror 218.

The first light reflected by the reflection mirror 218 passes through the objective lens 221 and the SIL 222, and is incident onto the recording medium 223. At this point, the pickup unit 221 includes a coil and a magnetic circuit to perform a servo operation for a gap error and a tracking error.

Meanwhile, a polarization component of an RF signal reflected by the recording medium 223 is changed by 180° and is converted into linear polarized light at the first QWP 216. At this point, the light has a polarization direction perpendicular to an original polarization direction.

Therefore, the RF signal is reflected by the first PBS 212 and incident to the first photoelectric element 213.

The first photoelectric element 213 converts the RF signal into an electrical signal to reproduce data stored in the recording medium 223.

Meanwhile, an optical recording/reproducing apparatus according to an embodiment of the present invention includes a gap servo optical block for controlling a gap between an SIL 222 and a recording medium 223.

A second light emitted from the second laser diode 210 (second light source) is changed into parallel light at the second collimator lens 231, and passes through the second PBS 232. A diverging angle or a converging angle of the second light is controlled by the second light expander 235.

Also, a polarization of the second light is converted at the second QWP 236, and is incident to the reflection mirror 218.

The second light reflected by the reflection mirror 218 passes through the objective lens 221 and the SIL 222, and is incident onto the recording medium 223.

At this point, a portion of the second light is totally reflected by the SIL 222. When a gap between the SIL 222 and the recording medium 223 is small, an amount of a light that is totally reflected is small. On the other hand, when the gap between the SIL 222 and the recording medium 223 is large, the amount of the light that is totally reflected is large.

This is due to relationship among the SIL 222, the recording medium 223, a refractive index of air contained between the SIL 222 and the recording medium 223, and a wavelength of the light. When the gap between the SIL 222 and the recording medium 223 is 100 nm or less, a gap between the SIL 222 and the recording medium 223, and an amount of a light that is totally reflected by the SIL 222 has a correlation, which is the same as that described with reference to FIGS. 5 to 14.

A second light reflected by the SIL 222 is reflected by the second PBS 232 and incident to the second photoelectric element 233. The second photoelectric element 233 detects a gap servo signal from the second light reflected by the SIL 222.

As described above, the first light emitted from the first light source 210 is for detecting an RF signal, and the second light emitted from the second light source 230 is for detecting a gap servo signal.

According to the present invention, a tilting amount by skew of the recording medium 223 can be known using a gap servo signal representing a gap between the SIL 222 and the recording medium 222. Also, the SIL 222 and the recording medium 223 are controlled such that they does not collide with each other through a gap servo operation.

Figure 16:
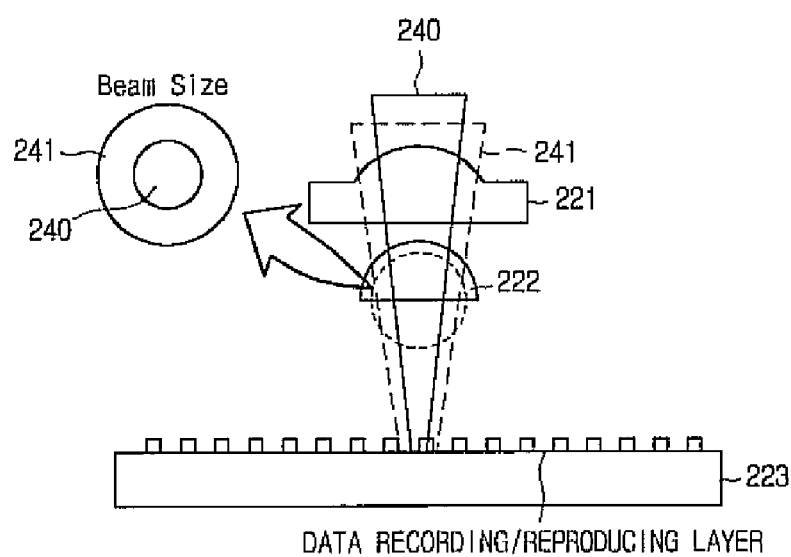
FIG. 16 is a view illustrating beams emitted from a first light source and a second light source are incident onto a recording medium.

FIG. 16 is a view illustrating lights emitted from a first light source and a second light source are incident onto a recording medium.

Referring to FIG. 16, the first light emitted from the first light source 210 and the second light emitted from the second light source 230 have different light sizes, respectively, at the SIL 222.

The first light 240 can be a light in a wavelength band of blue light having a short wavelength, and the second light 241 can be a light in a wavelength band of red light having a relatively long wavelength.

Since the second light 241 is incident in a relatively large size onto the SIL 222, a gap error signal by skew of the recording medium 223 can be more accurately detected from the second light 241.

Figure 17:
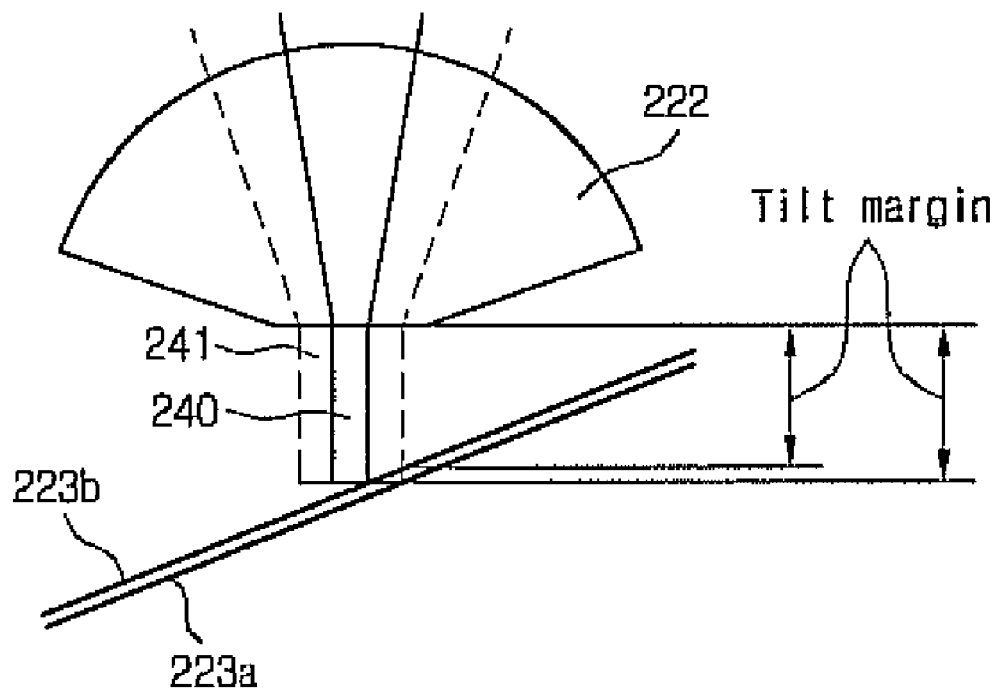
FIG. 17 is a view comparing a tilt margin by a beam emitted from a first light source with a tilt margin by a beam emitted from a second light source.

FIG. 17 is a view comparing a tilt margin by a light emitted from a first light source with a tilt margin by a light emitted from a second light source.

The first light 240 emitted from the first light source 210 has a small light size at the SIL 222, and a tilt margin of the recording medium 223 that can be detected using the small light size is small.

That is, in the case where a gap servo is performed using the first light 240, a tilting state of the recording medium 223 can be detected when the recording medium 223 is located at a first position 223b. Therefore, when the recording medium 223 is located on the first position 223b, the pickup unit 220 performs a control operation by a gap servo in order to prevent collision between the SIL 222 and the recording medium 223.

On the other hand, the second light emitted from the second light source 230 has a large light size at the SIL 222, and a tilt margin of the recording medium 223 that can be detected using the large light size is greater than the tilt margin of the recording medium 223 that can be detected using the first light 240.

That is, in the case where the gap servo is performed using the second light 241, a tilting state of the recording medium 223 can be detected when the recording medium 223 is located at a second position 223a.

Therefore, in the case where the gap servo is performed using the second light 241, a movement of the recording medium 223 can be more sensitively detected, and a control operation by the gap servo can be more swiftly performed.

Also, since the second light 241 has a relatively large light size at the SIL 222, a signal more sensitive to skew of the recording medium 223 can be obtained.

Figure 18:
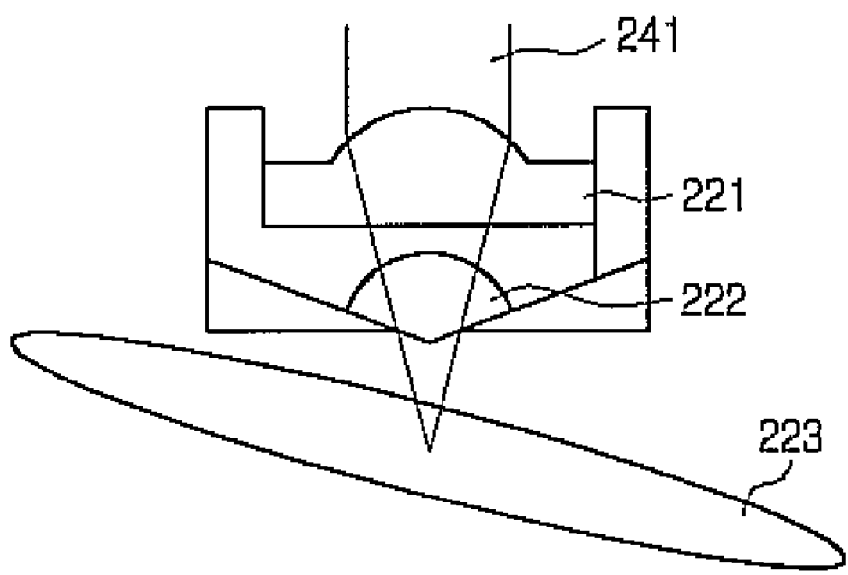
FIGS. 18 and 19 are views explaining a beam spot at a photoelectric element by skew of a recording medium.
Figure 19:
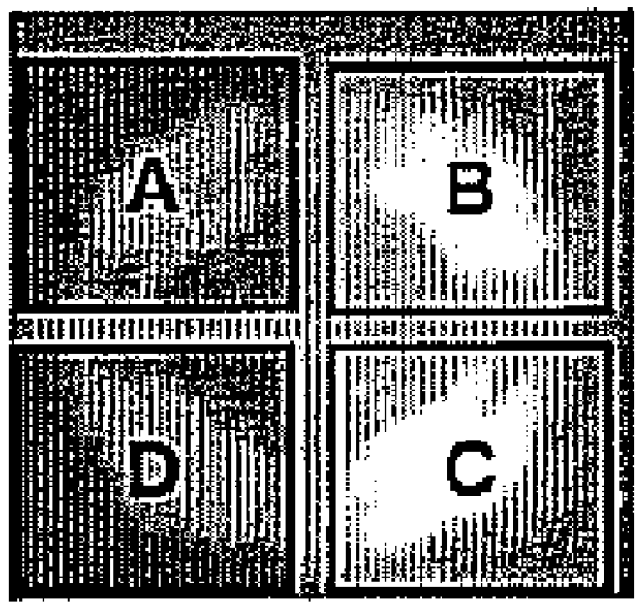

FIGS. 18 and 19 are views explaining a light spot at a photoelectric element by skew of a recording medium.

Referring to FIGS. 18 and 19, when skew is generated to the recording medium 223 while the second light 241 is incident onto the recording medium 223, the second photoelectric element 233 can detect skew of the recording medium 223 using a value of a signal of (A+B)−(C+D). Accordingly, a gap servo operation for preventing damage of the SIL 122 caused by collision between the SIL 222 and the recording medium 223 can be performed.

That is, an optical recording/reproducing apparatus according to an embodiment of the present invention includes the first light source 210 for recording or reproducing data, and the second light source 230 for the gap servo operation. Skew of the recording medium 223 can be sensitively detected by making a wavelength of the light emitted from the second light source 230 longer than that of the first light source 210.

Figure 20:
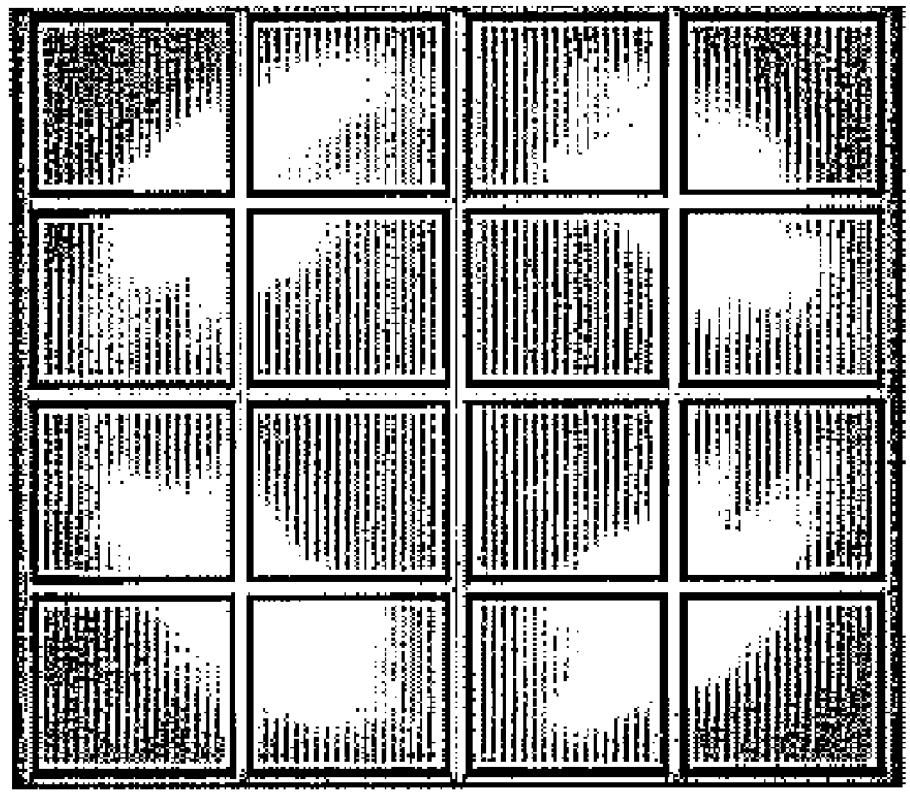
FIG. 20 is a view illustrating another example of a photoelectric element in a recording/reproducing apparatus according to an embodiment of the present invention.

FIG. 20 is a view illustrating another example of a photoelectric element in a recording/reproducing apparatus according to an embodiment of the present invention.

Unlike the second photoelectric element 233 illustrated in FIG. 19, the second photoelectric element 233 illustrated in FIG. 20 is divided into sixteen cells, and has an advantage of more sensitively detecting skew of the recording medium 223 compared to the photoelectric element divided into four cells (FIG. 19).

Though not shown, the present invention can more sensitively detect skew of the recording medium 223 by providing a photoelectric detector including four cells or more.

Figure 21:
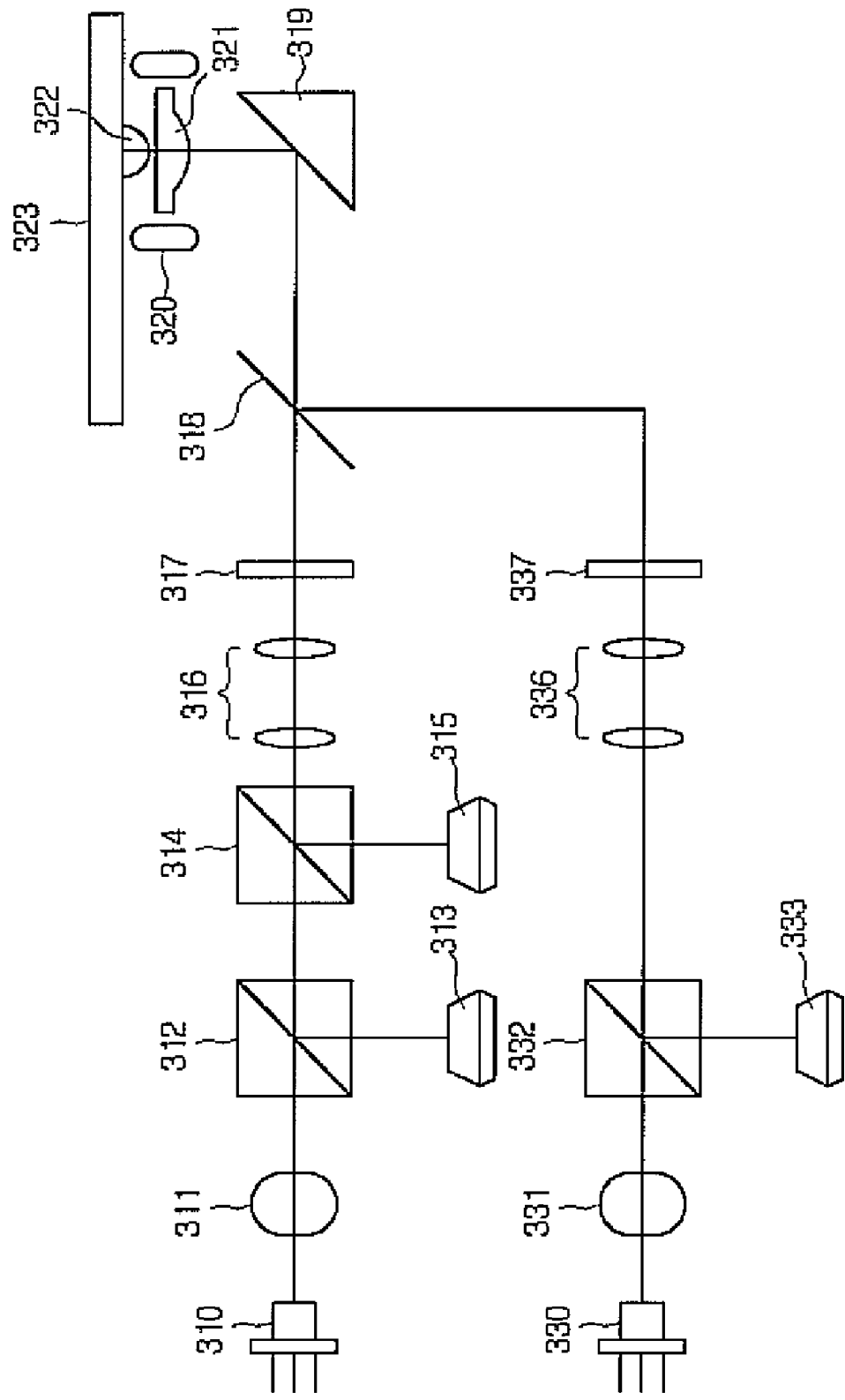
FIG. 21 is a view explaining a recording/reproducing apparatus according to another embodiment of the present invention.

FIG. 21 is a view explaining a recording/reproducing apparatus according to another embodiment of the present invention.

Referring to FIG. 21, the recording/reproducing apparatus includes a first optical system for recording/reproducing data to/from a recording medium 323, a second optical system for detecting a gap error signal between the recording medium 323 and an SIL 322, and a pickup unit 320 onto which light reflected by the recording medium 323 is incident and including the SIL 322 and an objective lens 321 allowing light to be incident onto the recording medium 323.

In detail, one of the first and second optical systems performs an operation of detecting a servo signal for detecting a tiling amount of the recording medium 323, and the other performs an operation of detecting an error signal generated by movement of the objective lens 321 during the tilting servo operation.

That is, it is possible to measure a tilting amount of the recording medium 323 and a movement amount of the objective lens 321 using a photoelectric element (e.g., a photo detector) provided to the first and second optical systems.

The first optical system includes a first light source 310 for emitting a blue light in a wavelength band of 405 nm, a first collimator lens 311 for changing the light emitted from the first light source 310 into parallel light, a first PBS 312 and a third PBS 314 for transmitting or reflecting incident light depending on a polarized component of the incident light, a third PBS 314, a first expander 316 for controlling a diverging angle or a converging angle of a light to control a light size, a first QWP 317 for changing a wavelength of an incident light, and a light splitter 318.

Also, the first optical system also includes a third photoelectric element 315 for detecting an RF signal reflected by the recording medium 323 and incident via the third PBS 314, and a firth photoelectric element 313 for detecting a gap error signal reflected by the recording medium 323 and incident via the first PBS 312.

For reference, the present invention is described using a photodetector as a photoelectric element.

The second optical system includes a second light source 330 for emitting a red light in a wavelength band of 650 nm, a second collimator lens 331 for changing the light emitted from the second light source 330 into parallel light, a second PBS 332 for transmitting or reflecting incident light depending on a polarized component of the incident light, a second expander 313 for controlling a diverging angle or a converging angle of a light to control a light size, and a second QWP 337 for changing a wavelength of an incident light.

Also, the second optical system also includes a second photoelectric element 333 for detecting a gap error signal reflected by the recording medium 323 and incident via the second PBS 332.

The pickup unit 320 includes an SIL 322 and an objective lens 321 for condensing an incident light onto the recording medium 323.

In operation, a first light emitted from the first light source 310 is changed into parallel light at the first collimator lens 311, and passes through the first PBS 312 and the third PBS 314. A diverging angle or a converging angle of the first light is controlled by the first expander 316, so that a light size is changed.

Also, the first light is converted from a linear polarized light to a circular polarized light at the first QWP 317, and is incident to the reflection mirror 319.

The first light reflected by the reflection mirror 319 passes through the objective lens 321 and the SIL 322, and is incident onto the recording medium 323. At this point, the pickup unit 321 includes a coil and a magnetic circuit to perform a servo operation for a gap error and a tracking error.

Meanwhile, the light reflected by the recording medium 323 is changed into a linear polarized light at the first QWP 317. Here, a polarization direction is changed into a polarization direction perpendicular to an original polarization direction.

In the case where the first light is used for a purpose of reproducing data recorded on the recording medium 323, the first light is not only reflected by a data recording/reproducing layer of the recording medium 323 but also a portion of the first light is totally reflected by the SIL 322 before incident onto the recording medium 323. Here, a surface by which the first light is totally reflected is a reflection surface of the SIL 322, and the reflection surface is a flat surface of the SIL 322 facing the recording medium 323.

In a near field optical recording/reproducing apparatus, coupling is generated by a correlation between a gap between the SIL 322 and the recording medium 323, and refractive indexes of the SIL 322, the recording medium 323, and air, so that a portion of the light incident onto the SIL 322 is totally reflected, and the rest is incident onto the recording medium 323.

Therefore, a portion of the light reflected by the recording medium 323 that has a polarization component of being reflected by the third PBS 314 is incident to the third photoelectric element 315. A signal incident to the third photoelectric element 315 becomes an RF signal. The third photoelectric element 315 converts the RF signal into an electrical signal to reproduce data stored in the recording medium 323.

Also, a portion of the light reflected by the recording medium 323 that has passed through the third PBS 314 (more specifically, the light totally reflected by the SIL) is reflected by the first PBS 312, and incident to the first photoelectric element 313. The signal incident to the first photoelectric element 313 serves as a signal for detecting a tilting amount of the recording medium 323, or serves as a signal for detecting a movement amount of the objective lens 321 or the pickup unit 320.

Also, the second photoelectric element, which will be described later, detects a tilting amount of the recording medium 323, or detects a movement amount of the objective lens 321 or the pickup unit 320.

Meanwhile, the second light emitted from the second light source 330 is changed into parallel light at the second collimator lens 331, passes through the second PBS 332, and is converted at the second QWP 337, and incident onto the reflection mirror 319.

The second light reflected by the reflection mirror 319 passes through the objective lens 321 and the SIL 322, and is incident onto the recording medium 323.

Also in this case, a portion of the second light is totally reflected by the SIL 322. In the case where a gap between the SIL 322 and the recording medium 323 is small, an amount of totally reflected light is small. On the other hand, in the case where the gap between the SIL 322 and the recording medium 323 is large, the amount of totally reflected light is large.

This is due to relationship among the SIL 322, the recording medium 323, a refractive index of air contained between the SIL 322 and the recording medium 323, and a wavelength of the light. When the gap between the SIL 322 and the recording medium 323 is 100 nm or less, a gap between the SIL 322 and the recording medium 323, and an amount of a light that is totally reflected by the SIL 322 has a correlation, which is the same as described above.

A second light reflected by the SIL 322 is reflected by the second PBS 332 and incident to the second photoelectric element 333. The second photoelectric element 333 detects a gap servo signal from the second light reflected by the SIL 322.

Also, a signal detected by the second photoelectric element 333 serves as a signal for detecting a tilting amount of the recording medium 323, or serves as a signal for detecting a movement amount of the objective lens 321 or the pickup unit 320.

The present invention uses both the first light and the second light, and particularly, uses only portions of the first and second lights that are totally reflected by the SIL 322 in order to detect a tilting error signal.

Regarding use of the first and second lights for detecting a tilting error signal, detail description will be made for the case where the recording medium 323 includes a cover layer (protective layer) and the case where the recording medium 323 does not include the cover layer with reference to FIGS. 21 to 27.

It is important to maintain a gap between the SIL and a surface of the recording medium in a near field recording medium. In the case where a cover layer is formed on the recording medium, a gap between a surface of the cover layer and the SIL needs to be maintained. On the other hand, in the case where the cover layer is not formed on the recording medium, a gap between a data recording/reproducing layer and the SIL needs to be maintained.

Figure 22:
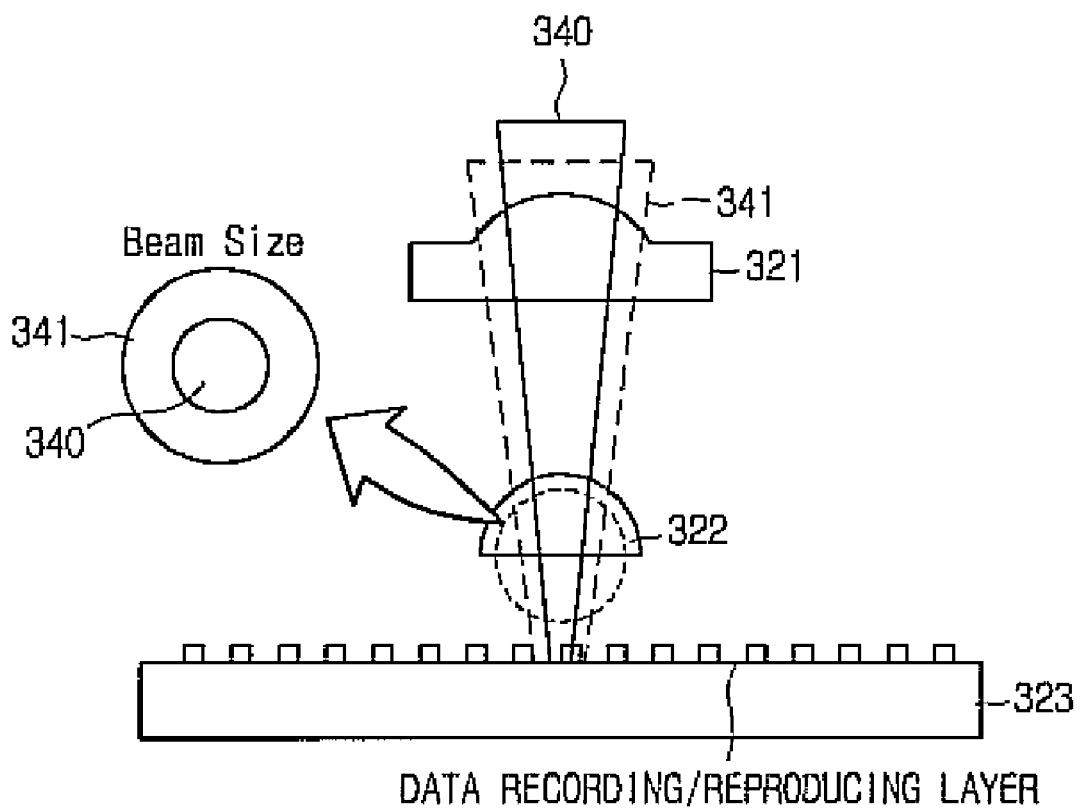
FIG. 22 is a view explaining light is incident onto a recording medium where a cover layer is not formed.
Figure 23:
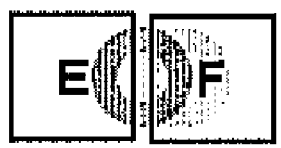
FIGS. 23 and 24 are views illustrating a beam spot at a photoelectric element by skew of a recording medium where a cover layer is not formed.
Figure 24:
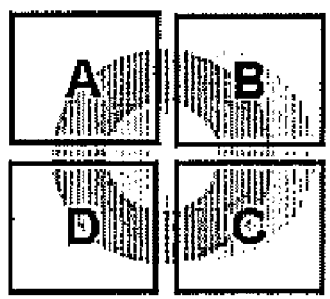

FIG. 22 is a view explaining light is incident onto a recording medium where a cover layer is not formed, and FIGS. 23 and 24 are views illustrating a light spot at a photoelectric element by skew of a recording medium where a cover layer is not formed.

Referring to FIG. 22 illustrating the case where a cover layer is not formed on a data recording/reproducing layer of the recording medium 323. At this point, a first light 340 is used for detecting an RF signal and detecting a DC offset by a movement of the objective lens 321, and the second light 341 is used for measuring a tilting amount of the recording medium.

That is, in the case where the cover layer is not formed on the recording medium 323, a focus of the first light 340 is formed on the data recording/reproducing layer, and a light size of the first light 340 at the SIL 322 is relatively large than that of the second light 341.

A focus of light generated from light source 310, 330 is adjusted by movement of the objective lens 321. The objective lens 321 can be moved to right/left and up/down by pickup unit 320.

Since a tiling amount (or a skew amount) of the recording medium 323 can be more accurately detected when a size of a light formed on the SIL 322 is large, the second light 341 is used for detecting a tilting amount of the recording medium 323.

Also, since a tilting amount of the recording medium 323 is difficult to detect when a size of a light formed on the SIL 322 is small, the first light 340 is used for detecting a movement amount (or a DC offset) of the objective lens 321 or the pickup unit 320 using the first photoelectric element 313 as well as detecting an RF signal.

In this case, photo-electric converted signals observed via the first and second photoelectric elements 313 and 333 are illustrated in FIGS. 23 and 24.

The first photoelectric element 313 can be a photo detector divided into two parts, and the second photoelectric element 333 can be a photo detector divided into four parts. That is, the first light 340 is used for detecting a DC offset by a movement of the objective lens 321 as well as recording and reproducing data using an RF signal.

Since a size of the first light 340 is smaller than that of the second light 341, it is difficult to detect a tiling amount of the recording medium 323 using the first light 340 as described above.

A light spot of the totally reflected by the SIL 322 that is photo-electric converted by the first photoelectric element 313 is illustrated in FIG. 23, and a DC offset by a movement of the objective lens 321 is k×(E−F).

Also, a light spot of the totally reflected by the SIL 322 that is photo-electric converted by the second photoelectric element 333 is illustrated in FIG. 24, and a tilting amount of the recoding medium 323 that is detected by the second photoelectric element 333 is [(A+D)−(B+C)]. That is, a difference between a left side and a right side of signals photoelectric-converted by the second photoelectric element 333 divided into four parts is a tiling amount.

Therefore, a tilting error signal TE of the recording medium that is measured according to an embodiment of the present invention is [(A+D)−(B+C)]−k×(E−F), and the objective lens 321 can perform a servo operation minimizing the tilting error signal TE.

Also, a detecting element for detecting a tilting error signal of the recording medium using the first and second photoelectric elements 313 and 333 can be further provided. In other words, the detecting element(or controller) detects a controlling signal including the tilting error signal.

Meanwhile, the case where a cover layer is formed on the recording medium 323 will be described with reference to FIGS. 25 to 27.

Generally, since a thickness of the cover layer is thicker than a distance between the SIL and a surface of the recording medium, a use of a light for detecting a tilting error signal of the recording medium is different in a recording/reproducing apparatus for a recording medium where a cover layer is formed.

That is, an operation of recording or reproducing data using the first light, which is a blue light, is the same for the cases where the cover layer is formed on the recording medium, but a distance between the data recording/reproducing layer and the SIL is relatively larger in the case where the cover layer is formed on the recording medium rather than the case where the cover layer is not formed on the recording medium, so that a size of a light formed on the SIL is different.

Figure 25:
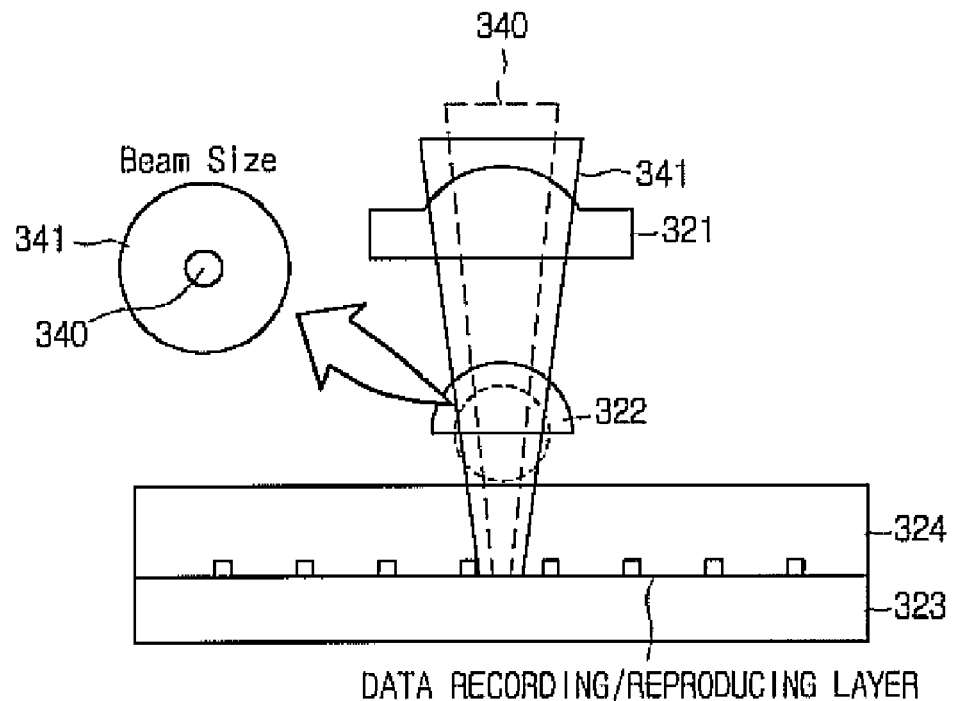
FIG. 25 is a view explaining a beam is incident onto a recording medium where a cover layer is formed.
Figure 26:
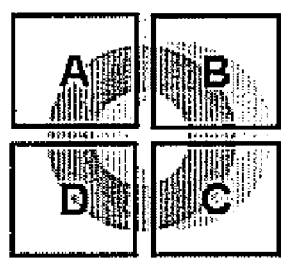
FIGS. 26 and 27 are views explaining a beam spot at a photoelectric element by tilting of a recording medium where a cover layer is formed.
Figure 27:

To explain this, FIGS. 25 to 27 are attached, FIG. 25 is a view explaining a light is incident onto a recording medium where a cover layer is formed, and FIGS. 26 and 27 are views explaining a light spot at a photoelectric element by tilting of a recording medium where a cover layer is formed. Referring to FIG. 25, the case of a recording/reproducing apparatus where the cover layer is formed on a data recording/reproducing layer of the recording medium 323 is illustrated. At this point, the first light 340 is used for detecting an RF signal and a tilting amount (or skew) of the recording medium. Also, the second light 341 is used for detecting a DC offset by a movement of the objective lens 321 during a servo control operation.

That is, in the case where the cover layer is formed on the recording medium 323, a light size of the first light 340 is greater than that of the second light 341 formed on the SIL 322, so that the second light 341 is used for detecting a DC offset.

In this case, photo-electric converted signals observed via the first and second photoelectric elements 313 and 333 are illustrated in FIGS. 26 and 27.

The first photoelectric element 313 can be a photo detector divided into four parts, and the second photoelectric element 333 can be a photo detector divided into two parts.

A light spot of the totally reflected by the SIL 322 that is photo-electric converted by the first photoelectric element 313 is illustrated in FIG. 26, and a tilting amount of the recoding medium 323 that is detected by the first photoelectric element 313 is [(A+D)−(B+C)]. That is, a difference between a left side and a right side of signals photoelectric-converted by the first photoelectric element 313 divided into four parts is a tiling amount of the recording medium.

Also, a light spot of the totally reflected by the SIL 322 that is photo-electric converted by the second photoelectric element 333 is illustrated in FIG. 27, and a DC offset caused by a movement of the objective lens 321 and detected by the second photoelectric element 333 is k×(E−F).

Therefore, a tilting error signal TE of the recording medium that is measured according to an embodiment of the present invention is [(A+D)−(B+C)]−k×(E−F), and the objective lens 321 can perform a servo operation minimizing the tilting error signal TE using the detecting element.

As described above, an optical recording/reproducing apparatus according to the present invention can be embodied for the case of recording/reproducing data to/from a recording medium where a cover layer is formed and for the case of recording/reproducing data to/from a recording medium where a cover layer is not formed. Also, a tilting error signal where a DC offset component caused by a movement of an objective lens is removed can be detected during a servo control operation, so that more accurate servo operation can be performed.

According to various embodiments proposed by the present invention, a tilting amount due to skew of a recording medium can be more accurately detected. Furthermore, an efficient recording or reproducing operation of data can be performed Although the preferred embodiments of the present invention have been disclosed for illustrative purpose, those skilled in the art will appreciate that various modifications, additions and substitutions can be made without departing from the scope and spirit of the invention as defined in the accompanying claims.

What is claimed is:

1. An apparatus for recording/reproducing data on/from a recording medium, the apparatus comprising:
   a pickup unit including an objective lens and a solid immersion lens (SIL) and transmitting light onto a recording medium;
   a plurality of photoelectric elements for receiving the light reflected from the recording medium to output a controlling signal, each of the plurality of photoelectric elements including a plurality of photo-detecting regions, each of the plurality of photo-detecting regions independently detecting an amount of the reflected light; and
   a controller controlling the pickup unit, using the controlling signal output from the plurality of photoelectric elements,
   wherein the controlling signal includes a tilting error signal according to skew of the recording medium, and the tilting error signal is obtained by calculating a difference between one signal detected by one of the plurality of photoelectric elements and another signal detected by another one of the plurality of photoelectric elements, and
   wherein the one signal detected by the one of the plurality of photoelectric elements and the another signal detected by the another one of the plurality of photoelectric elements are obtained based on a difference between the amount of the reflected light detected by each of the plurality of photo-detecting regions,
   wherein the plurality of photoelectric elements comprises:
   a first photoelectric element which constitutes a radio frequency (RF) optical block for obtaining an RF signal from the light reflected by the recording medium, a signal obtained by the first photoelectric element being used to obtain the tilting error signal of the recording medium and to detect the RF signal; and
   a second photoelectric element which constitutes a servo optical block for detecting the tilting error signal of the recording medium having a difference in a moving path with respect to light incident from the first photoelectric element of the light reflected by the recording medium.

2. The apparatus according to claim 1, wherein the tilting error signal contains an error signal of a radial direction of the recording medium and an error signal of a tangential direction of the recording medium.

3. The apparatus according to claim 1, wherein the controller controls a gap between the solid immersion lens and the recording medium to be constant by performing a feedback servo operation based on the controlling signal.

4. The apparatus according to claim 1, further comprising a light source, wherein the controller controls a lightpower of the light source by using the controlling signal outputted by the plurality of photoelectric elements.

5. The apparatus according to claim 4, wherein a focus of light generated from the light source is adjusted by movement of the objective lens.

6. An apparatus for recording/reproducing data on/from a recording medium, the apparatus comprising:
   a first optical system including a first photoelectric element for detecting an electrical signal from a first light reflected by a recording medium using the first light;
   a second optical system including a second photoelectric element for detecting a servo signal from a second light reflected by a solid immersion lens using the second light; and
   a pickup unit including an objective lens and the solid immersion lens and transmitting the first light onto the recording medium, wherein the pickup unit is driven by the servo signal of the second light in response to a controlling signal,
   wherein each of the first and second photoelectric elements includes a plurality of photo-detecting regions, each of the plurality of photo-detecting regions independently detecting an amount of the reflected first and second light,
   wherein the controlling signal includes a tilting error signal according to skew of the recording medium, and the tilting error signal is obtained by calculating a difference between one signal detected by the first optical system and another signal detected by the second optical system, and wherein the one signal detected by the first optical system and the another signal detected by the second optical system are detected by the first or second optical system obtained based on a difference between the amount of the reflected light detected by each of the plurality of photo-detecting regions, wherein the first photoelectric element constitutes a radio frequency (RF) optical block for obtaining an RF signal from the first light reflected by the recording medium and a signal obtained by the first photoelectric element is used to obtain the tilting error signal of the recording medium and to detect the RF signal, and wherein the second photoelectric element constitutes a servo optical block for detecting the tilting error signal of the recording medium having a difference in a moving path with respect to light incident from the first photoelectric element of the first light reflected by the recording medium.

7. The apparatus according to claim 6, wherein the servo signal contains tilting data according to the skew of the recording medium.

8. The apparatus according to claim 6, wherein a size of the second light condensed onto the solid immersion lens is greater than a size of the first light.

9. The apparatus according to claim 6, wherein each of the first and second photoelectric elements is a photo detector including four or more cells.

10. An apparatus for recording/reproducing data on/from a recording medium, the apparatus comprising:

a pickup unit including an objective lens and transmitting a first light onto a recording medium and a solid immersion lens;

a first optical system including a first photoelectric element for detecting a first servo signal from the first light reflected by the solid immersion lens using the first light, and a third photoelectric element for detecting a radio frequency (RF) signal from the first light reflected by the recording medium; and a second optical system including a second photoelectric element for detecting a second servo signal from a second light reflected by the solid immersion lens using the second light, wherein each of the first and second photoelectric elements includes a plurality of photo-detecting regions, each of the plurality of photo-detecting regions independently detecting an amount of the reflected light, and wherein the pickup unit is controlled using a tilting error signal to eliminate a tilting error, and the tilting error signal is obtained by calculating a difference between the first servo signal and the second servo signal, each of the first and second servo signals obtained based on a difference between the amount of the reflected light detected by each of the plurality of photo-detecting regions, wherein the third photoelectric element constitutes an RF optical block for obtaining the RF signal from the first light reflected by the recording medium and a signal obtained by the third photoelectric element is used to obtain the tilting error signal of the recording medium and to detect the RF signal, and wherein the first and the second photoelectric elements constitute a servo optical block for detecting the tilting error signal of the recording medium having a difference in a moving path with respect to light incident from the third photoelectric element of the first light reflected by the recording medium.

11. The apparatus according to claim 10, wherein the first servo signal contains tilting data of the recording medium, and the second servo signal contains data regarding a movement amount of the pickup unit.

12. The apparatus according to claim 10, wherein the first servo signal contains data regarding a movement amount of the pickup unit, and the second servo signal contains tilting data of the recording medium.

13. The apparatus according to claim 10, further comprising a detecting element for measuring the tilting error signal of the recording medium using the first and second servo signals detected by the first and second photoelectric elements.

14. An apparatus for recording/reproducing data on/from a recording medium, the apparatus comprising:

a first photoelectric element provided within a first optical system, the first photoelectric element using a first light for recording/reproducing data and detecting a first servo signal;

a second photoelectric element provided within a second optical system, the second photoelectric element using a second light and detecting a second servo signal;

a detecting element for detecting a controlling signal of the recording medium using the first and second servo signals; and a pickup unit including an objective lens and a solid immersion lens, the pickup unit transmitting the first light onto the recording medium and driven in response to a feedback operation of the controlling signal, wherein each of the first and second photoelectric elements includes a plurality of photo-detecting regions, each of the plurality of photo-detecting regions independently detecting an amount of the reflected light, and wherein the controlling signal includes a tilting error signal according to skew of the recording medium, and the tilting error signal is obtained by calculating a difference between the first servo signal and the second servo signal, each of the first and second servo signals obtained based on a difference between the amount of the reflected light detected by each of the plurality of photo-detecting regions, wherein the first photoelectric element constitutes a radio frequency (RF) optical block for obtaining an RF signal from the first light reflected by the recording medium and a signal obtained by the first photoelectric element is used to obtain the tilting error signal of the recording medium and to detect the RF signal, and wherein the second photoelectric element constitutes a servo optical block for detecting the tilting error signal of the recording medium having a difference in a moving path with respect to a light incident from the first photoelectric element of the first light reflected by the recording medium.

15. The apparatus according to claim 14, wherein one of the first and second servo signals contains data regarding a tilting amount of the recording medium, and the other of the first and second servo signals contains data regarding a movement amount of the objective lens.

16. A method for recording/reproducing data on/from a recording medium, the method comprising:

splitting light, the light transmitted onto the recording medium by a pickup unit including an objective lens and a solid immersion lens;

detecting a first servo signal with a first photoelectric element;
detecting a second servo signal with a second photoelectric element;
calculating a difference between the first servo signal and the second servo signal to obtain a tilting error signal; and
controlling a servo operation of the pickup unit based on the tilting error signal,
wherein each of the first and second photoelectric elements includes a plurality of photo-detecting regions, each of the plurality of photo-detecting regions independently detecting an amount of reflected light, and
wherein each of the first and second servo signals is obtained based on a difference between the amount of the reflected light detected by each of the plurality of photo-detecting regions,
wherein the first photoelectric element constitutes a radio frequency (RF) optical block for obtaining an RF signal from the light reflected by the recording medium and a signal obtained by the first photoelectric element is used to obtain the tilting error signal of the recording medium and to detect the RF signal, and
wherein the second photoelectric element constitutes a servo optical block for detecting the tilting error signal of the recording medium having a difference in a moving path with respect to light incident from the first photoelectric element of the light reflected by the recording medium.

17. The method according to claim 16, further comprising:
creating a feedback signal to control power of the light, wherein the light is generated from a light source or a plurality of light sources.

18. The method according to claim 17, wherein the light source generates a plurality of light having different wavelength bands.

19. A method for recording/reproducing data on/from a recording medium, the method comprising:
transmitting a first light onto an objective lens and a solid immersion lens to record or reproduce the data;
detecting a first servo signal from the first light reflected by the solid immersion lens using a first photoelectric element;
detecting a second servo signal from a second light reflected by the solid immersion lens using a second photoelectric element;
obtaining a tilting error signal by calculating a difference between the first servo signal and the second servo signal; and
controlling a servo operation of a pickup unit based on the tilting error signal to eliminate a tilting error,
wherein each of the first and second photoelectric elements includes a plurality of photo-detecting regions, each of the plurality of photo-detecting regions independently detecting an amount of the reflected light, and
wherein each of the first and second servo signals is obtained based on a difference between the amount of the reflected light detected by each of the plurality of photo-detecting regions,
wherein the first photoelectric element constitutes a radio frequency (RF) optical block for obtaining an RF signal from the first light reflected by the recording medium and a signal obtained by the first photoelectric element is used to obtain the tilting error signal of the recording medium and to detect the RF signal, and
wherein the second photoelectric element constitutes a servo optical block for detecting the tilting error signal of the recording medium having a difference in a moving path with respect to a light incident from the first photoelectric element of the first light reflected by the recording medium.

20. The method according to claim 19, wherein one of the first and second servo signals contains data regarding tilting of the recording medium.

21. The method according to claim 19, wherein one of the first and second servo signals contains data regarding a movement amount of the objective lens by the servo operation.

* * * * *